US00RE36800E

United States Patent [19]

Vetter et al.

[11] E Patent Number: Re. 36,800

[45] Reissued Date of Patent: Aug. 1, 2000

[54] BOOT BINDING COUPLING FOR SNOW BOARDS

[76] Inventors: Dennis A. Vetter, 6644 S. 196th St., Ste. T-104, Kent, Wash. 98032; Eric L. Eaton, 6646 S. Prospect, Tacoma, Wash. 98409

[21] Appl. No.: 08/702,943

[22] Filed: Aug. 26, 1996

Related U.S. Patent Documents

Reissue of:

[64] Patent No.: 5,354,088
Issued: Oct. 11, 1994
Appl. No.: 08/034,826
Filed: Mar. 15, 1993

[51] Int. Cl.[7] ..... A63C 9/08

[52] U.S. Cl. ..... 280/618; 280/633; 280/14.2

[58] Field of Search ..... 280/14.2, 607, 280/613, 617, 618, 622, 630, 633, 629

[56] References Cited

U.S. PATENT DOCUMENTS

| | | | |
|---|---|---|---|
| 3,614,119 | 10/1971 | Wilkes | 280/622 |
| 4,165,887 | 8/1979 | Bunn, Jr. | 280/622 X |
| 4,728,116 | 3/1988 | Hill | 280/618 |
| 5,035,443 | 7/1991 | Kincheloe | 280/618 |
| 5,044,654 | 9/1991 | Meyer | 280/613 |
| 5,054,807 | 10/1991 | Fauvet | 280/14.2 X |
| 5,277,635 | 1/1994 | Gillis | 280/14.2 X |

FOREIGN PATENT DOCUMENTS

| | | | |
|---|---|---|---|
| 285558 | 10/1988 | European Pat. Off. | 280/618 |
| 3916453 | 8/1990 | Germany | 280/14.2 |
| 4034099 | 8/1991 | Germany | 280/14.2 |
| 678278 | 8/1991 | Switzerland | 280/14.2 |

*Primary Examiner*—J. J. Swann
*Assistant Examiner*—Michael Mar
*Attorney, Agent, or Firm*—Delbert J. Barnard

[57] ABSTRACT

A coupling for releasably mounting a boot with boot binding to a turntable which is adjustably secured to a snowboard. The boot binding includes a plurality of extending lock pins each with a shoe releasably locking into arcuate slots in the turntable. The boot binding is quickly directed to the coupling with a set of guide pins protruding from the boot binding, which pods also serve as improved traction devices when the boot binding is disengaged from the turntable. Also extending from the boot binding plate is a latch pin held under spring bias which when aligned in a hold position, fits into one of several latch pin holes in the turntable. To release the plates from hold position, the latch pin is pulled from the latch pin hole by a flexible hand extension release device hand operated from a standing position and the plates are rotated to disengage the shoes from the arcuate slots.

29 Claims, 4 Drawing Sheets

BOOT BINDING COUPLING FOR SNOW BOARDS

Matter enclosed in heavy brackets [ ] appears in the original patent but forms no part of this reissue specification; matter printed in italics indicates the additions made by reissue.

TECHNICAL FIELD

This invention relates to snow boards, and more specifically, to a coupling useful for releasably connecting a user boot binding to a snowboard, operated via a flexible hand extension release device.

BACKGROUND OF THE INVENTION

It has become well-known in recent years to use snowboards on ski slopes as another form of winter recreation similar to skiing- Snowboards are commercially available, for example, from Burton Snowboards of Manchester, Center, Vt.

A snowboard rider uses a boot designed especially to the requirements of snowboarding. As with skiing, it is required to secure the boot to the snowboard with a binding. However, snowboarding differs from skiing in that both user boots attach to a single snowboard, and the user does not employ poles. Also unlike skiing, the boot bindings are mounted to the snowboard with screws into a pattern of screw holes, possible threaded inserts in the snowboard. This pattern of screw holes or inserts typically allows adjustment in stance relative to the longitudinal center line of the snowboard and stance width. The stance angle is varied with user preference and the style of snowboarding intended. Stance width is selected by the user on the basis of personal comfort and leg length. Typically, changing the stance angle means releasing the boot from its binding and loosening the mounting screws so that the binding may be rotated, and then retightening the screws. Changing the stance width means removing the screws entirely and selecting another pattern of screw holes or inserts in the snowboard.

Before the present invention, it was not known in the art to have a readily available adjustment to the stance angle without removing the boot from the binding so that the user could change his orientation relative to the board.

When using commercial ski area chair lifts, a snowboard user is required to disengage at least one boot from a boot binding to maneuver onto the chair because he is generally immobile with both legs attached to a single board, no ski poles, and no downward sloping terrain in his intended direction of travel. With one leg disengaged, he pushes himself forward with his free leg. This maneuvering with one leg attached to the snowboard and the other free is referred to as "skate boarding."

Having mounted the chair with only one boot attached to the board, the user is again challenged to dismount from the chair in full motion with a single boot engaged, usually down a slight incline. A toughened surface is usually provided on the snowboard for temporary control during dismounting; the user places the unbound boot on the roughened surface which then allows limited control until he stops to rebind the boot to the boot binding. Thus, the snowboarder often finds himself stopped soon after dismounting from the ski lift chair to remount his free boot, often endangering himself and others, or he may have fallen for lack of adequate control.

Before this invention, a quick release of the boot binding from the snowboard from the user standing position was not known in the art, nor was it known to have a device on the bottom of the disengaged boot binding to improve traction. Generally, one boot had to be unstrapped from a board, an inconvenient and cumbersome task, as best. Then, with one boot disengaged, the user attempted to approach the ski chair lift. Although routine for traditional skiers, this normally simple task became a challenge without poles to assist, using only the disengaged boot pushing against the snow and ice with limited traction.

One solution to rebinding problem is to attempt to rebind the boot while sitting on the chair. This is usually very difficult and perhaps dangerous. Another solution is to have a couplng for one boot binding easily released upon maneuvering toward the ski lift chair that quickly rejoins the boot and boot binding to the board. Kincheloe, U. S. Pat. No. 5,035,443, describes a binding designed to disengage easily. Briefly, the coupling comprises a channelled groove into which a plate slides to a securing position. In practice, it is found that the coupling does not operate quickly enough to reengage upon dismount from the lift chair during the dismount action. It is also found that when ice gathers in the binding, the boot may not mount at all until ice is cleared. Thus, the problem remains to have a binding that is not only easily released but that reliably and quickly reengages the boot onto the board, even in the presence of ice and snow.

SUMMARY OF THE INVENTION

The present invention provides a snowboard coupling for use between the snowboard and the user boot binding and a quick release from the standing position. The coupling allows the user to reengage the boot binding to the board as the user dismounts from the ski lift chair by standing on the coupling followed by a short twisting motion that exploits the strength of the leg muscles.

The coupling includes a turntable ring with a center hole and a boot binding plate. The turntable ring is spaced apart from the snowboard when mounted by a spacer plate. The turntable ring has a journal surface about its inner edge. A circular mounting plate having an annular raceway about its circumference that fits over the ring with the raceway overlapping on the journal surface, filling the ring center. The spacer plate may be separate and secured to the turntable ring or an integral part of the turntable. For mounting the turntable ring under the mounting plate to a snowboard, the mounting plate has a plurality of screw holes matching threaded holes, or inserts, in the snowboard. Thus, the turntable is secured to the snowboard, spaced therefrom by the spacer plate when mounting screws pass through these mounting plate holes and screw into the matching holes in the snowboard.

In the alternative, the mounting plate is dispensed with when the turntable ring has a plurality of arcuate screw slots on a concentric arc through which mounting screws pass, allowing rotation of the turntable through the arcuate dimension of the slots, similar to the rotation allowed with the mounting plate raceway sliding on the turntable ring journalled surface, both when the screws are not fully tightened.

When the turntable ring is rotated into a desired position, the mounting plate is secured tightly onto the board with the mounting screws through the matching screw holes.

The turntable ring further includes on a circular arc concentric with the cirular plates a plurality of similar arcuate mounting slots. Each arcuate slot has a first large opening on one end. On the other end may be a second large opening. Also on the turntable ring is a plurality of latch pin holes.

In face-to-face contact with the turntable ring is a boot binding plate. On the boot binding plate is a plurality of slotted lock pins located and sized to match the large openings of the arcuate mounting slots of the turntable ring. Each lock pin has a waist separating a flange and a shoe. The flange is affixed to the boot binding plate. The shoe is sized to fit into a turntable arcuate slot large opening, and the waist is sized to slidably fit into the turntable ring arcuate slot, securing the shoe behind the arcuate slot in a hold position.

To easily locate the shoe into the arcuate large opening, a plurality of guide pins are provided on a circular arc on the boot binding plate outside of the lock pins and outside the radius of the turntable, extending slightly farther from the plate than do the lock pins. In use, the guide pins first orient the boot binding plate over the turntable ring. Slight movement then quickly locates the lock pin shoes into the turntable slots. The guide pins also serve as improved traction devices when the user is pushing with the disengaged boot binding to move toward a chair lift.

Also extending from the boot binding plate is a latch pin held under spring bias. The latch pin is sized and located to fit into one of the turntable latch pin holes when the lock pins are inserted into matching large openings of the arcuate mounting slots of the turntable ring in either end and rotated with their respective shoes behind the arcuate slot. When the latch pin is compressed under spring bias as the turntable and boot binding plates are urged together, it releases into the latch pin hole when the plates are rotated into hold position. With the plurality of latch pin holes, an adjustment or selection of angular orientation of the boot binding to the snowboard may be selected, even while snowboarding. Typically, 2 latch pin holes are angularly offset approximately 10 degrees. To release the plates from hold position, the latch pin is pulled from the latch pin hole by a flexible hand extension release device and the plates are rotated to engage/release position where the shoes are aligned with the turntable ring arcuate slot large openings. The release device extends from the latch pin where it is connected to the upper leg of the user within reach of the user without undue stooping where it is flexibly secured.

DETAILED DESCRIPTION OF THE PREFERRED EMBODIMENT

Figure 1:
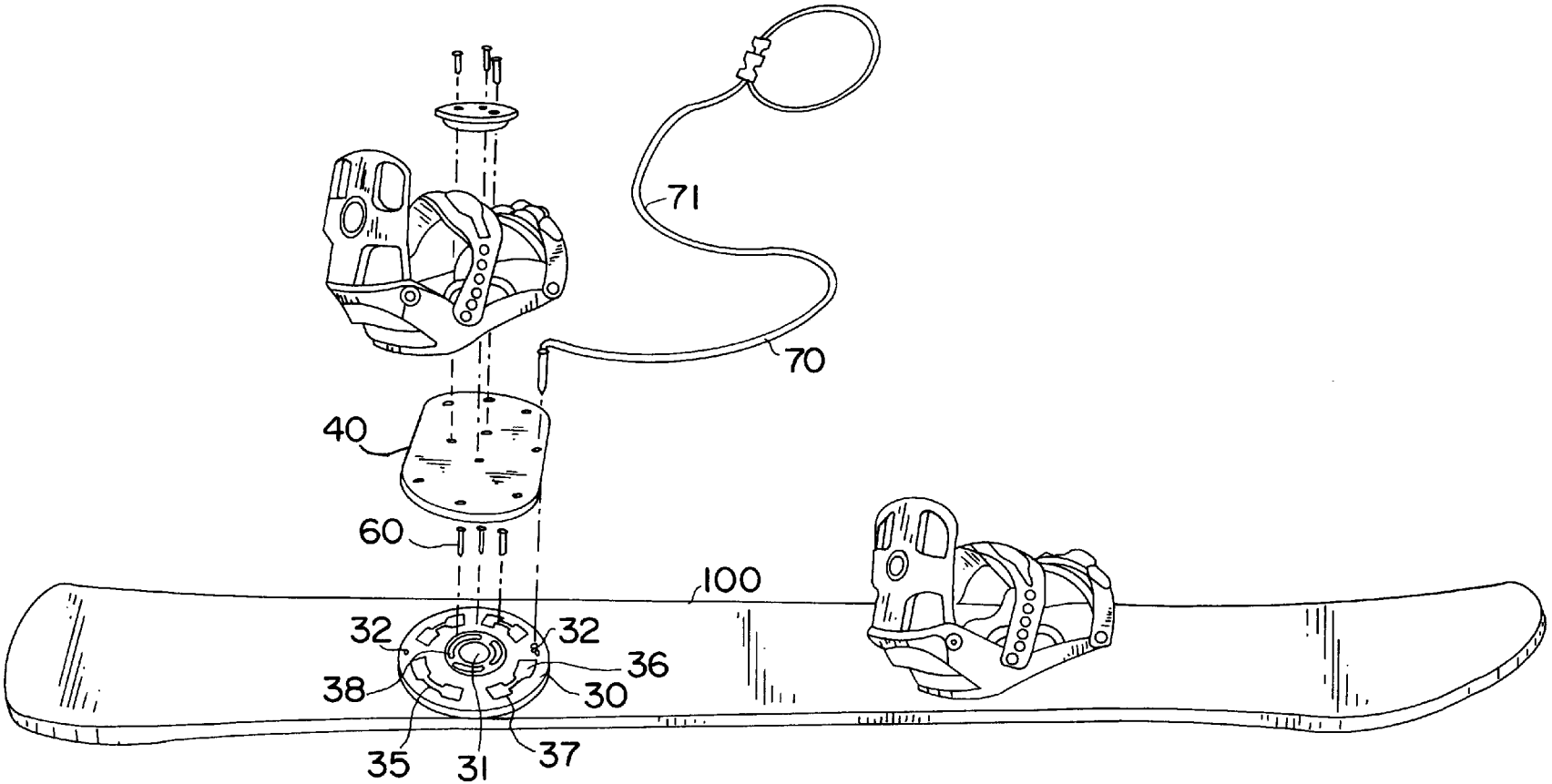
FIG. 1 is an exploded projection pictorial view of the releasable bindings in combination with a snowboard and boot.
Figure 2:
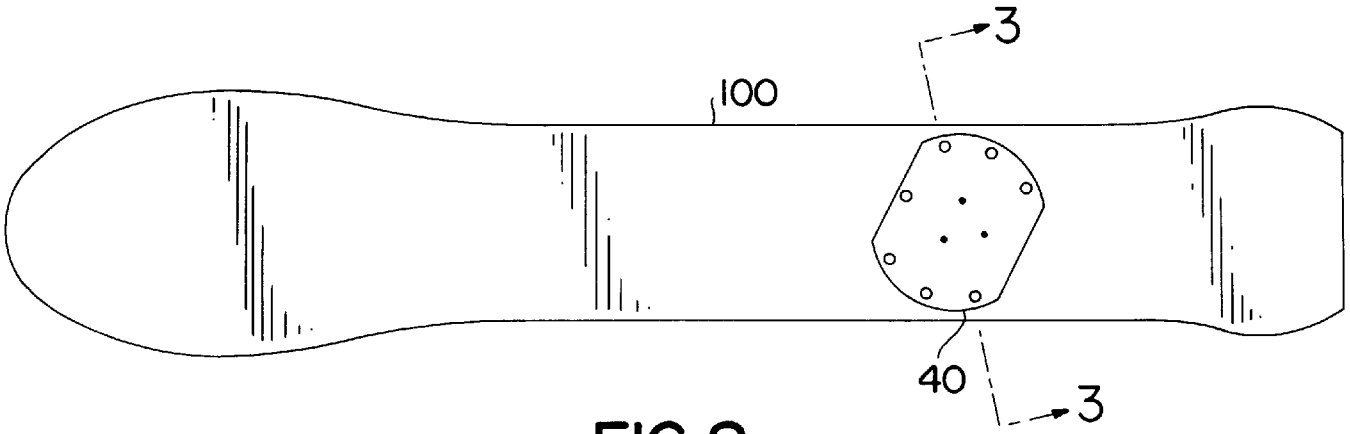
FIG. 2 is a pictorial top view of a binding mounted on snowboard.
Figure 3:
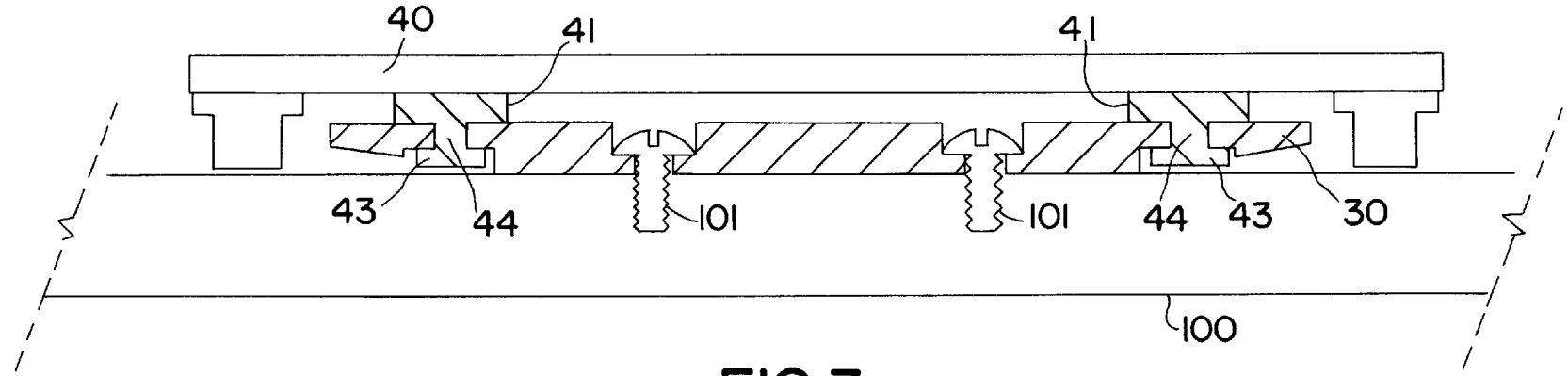
FIG. 3 is a cross-sectional view of the binding mounted on the snowboard.
Figure 6:
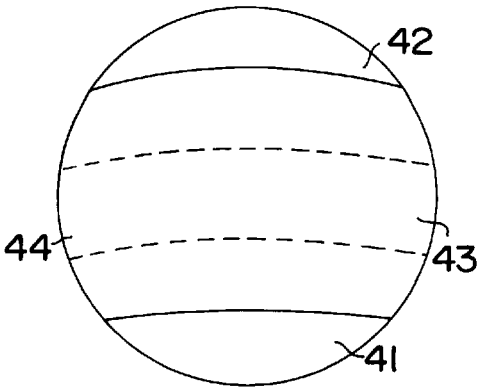
FIG. 6 is a bottom view of the lock pin.
Figure 4:
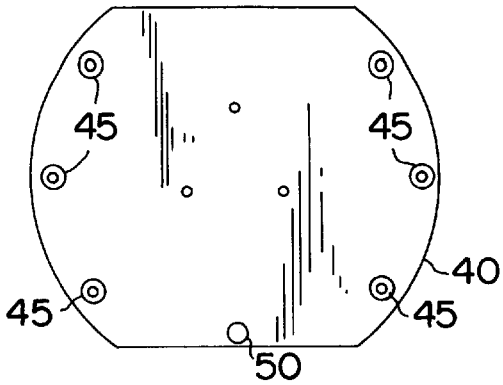
FIG. 4 is a top schematic view of the boot binding plate showing preferred lock pin and guide pin locations.
Figure 5:
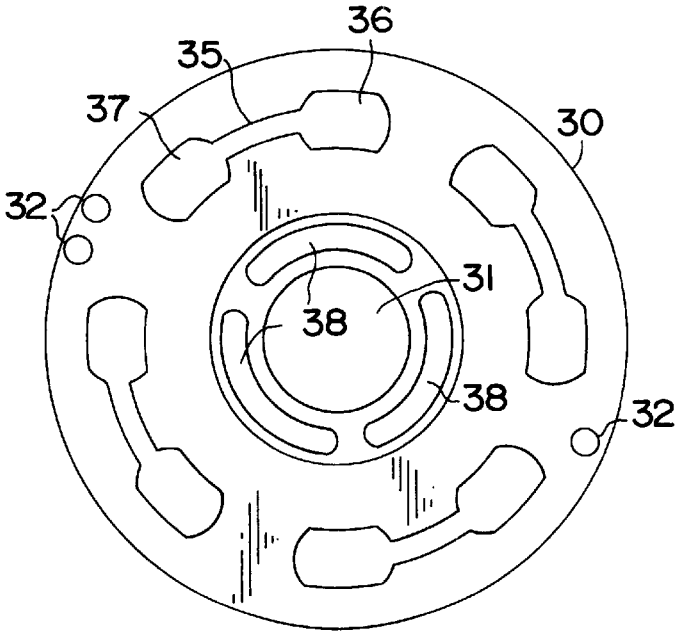
FIG. 5 is a top schematic view of the turntable ring with arcuate screw slots.
Figure 7:
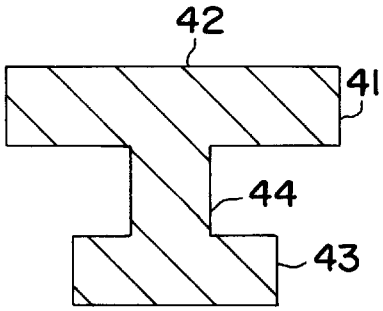
FIG. 7 is a side cross-sectional view of the lock pin.
Figure 8:
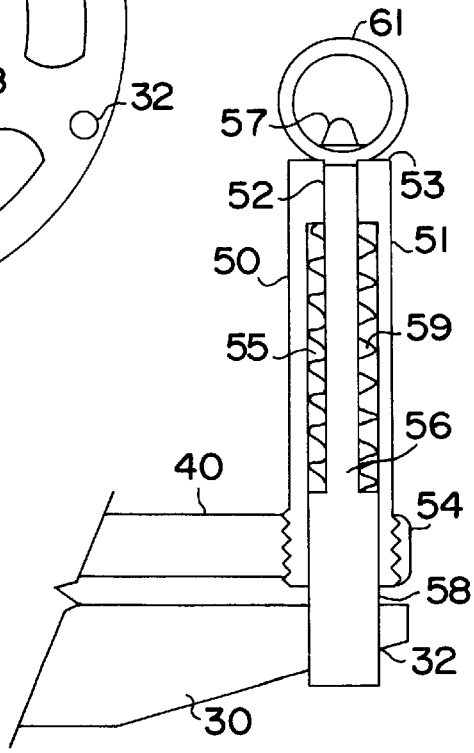
FIG. 8 is a side cross-sectional view of the latch pin with spring bias.
Figure 9:
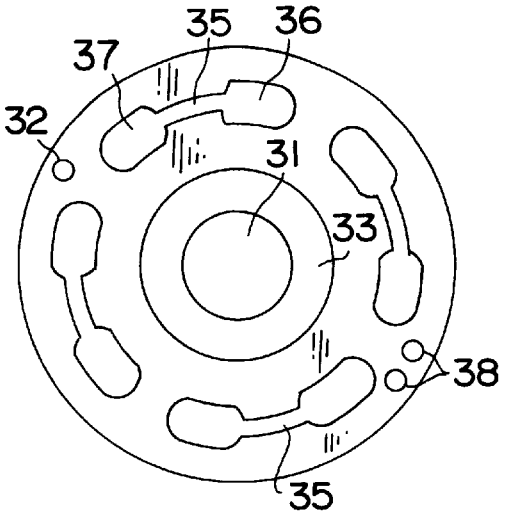
FIG. 9 is a top schematic view of the turntable ring with inner journal surface.
Figure 10:
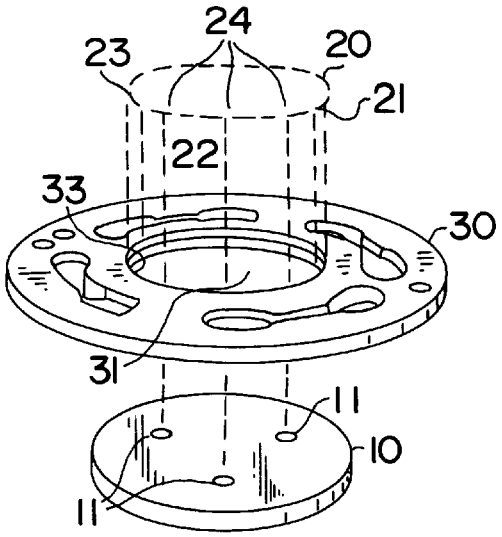
FIG. 10 is an exploded view of the spacer plate, turntable ring and mounting plate.
Figure 11A:
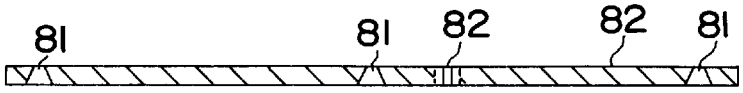
FIG. 11a and 11b are side cross-sectional and top view of an adapter plate.
Figure 11B:
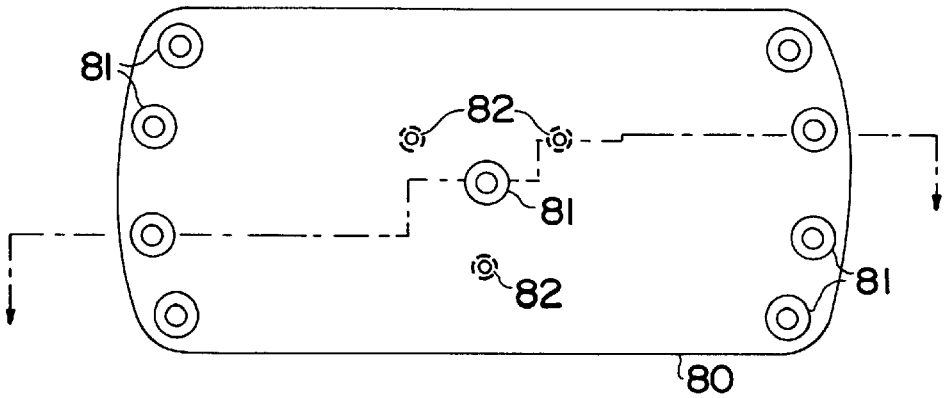

Referring to the figures, the present invention comprises a spacer plate 10, mounting plate 20, a circular turntable ring 30 with a concentric center hole 31, a plurality of latch pin holes 32 , a boot binding plate 40 , and a release latch pin unit 50.

The spacer plate 10 comprises a set of mounting holes 11 matching a pattern of threaded screw holes 101 in a snowboard 100 against which this plate is secured.

The mounting plate 20 comprises a set of mounting holes 21 matching those of the spacer plate 10. About the circumference of this spacer plate 20 is an annular raceway 21 formed by a circumferential flat 22 on the plate edge 23.

The turntable ring 30 comprises an inner annular journal surface 33 defining its inner center hole 31 sized to fit into the raceway of the mounting plate 20. With mounting plate 20 concentrically placed over the turntable ring 30 with its mounting holes 24 in alignment with the spacer plate mounting holes 11, the turntable ring 30 is secured to the snowboard 100 with its journal surface 33 overlapping with the mounting plate raceway 21 with screws 60 passing through the aligned mounting holes and into threaded holes in the snowboard 100 . With the screws not tightened, the turntable ring 30 rotates freely on its journal surface 33 in the mounting plate raceway 21. When the screws are tightened, the turntable ring 30 is rotationally fixed and secured to the snowboard 100.

In an alternative embodiment, the turntable ring 30 comprises a plurality of arcuate screw slots 38 into which mounting screws pass with the screw head larger than and hence held by the slot. The slots 38 allow a measure of angular adjustment of the turntable ring 30 on the snowboard 100 when the screws are not securely tightened, thus alleviating the need for the mounting plate 20 with the raceway 21 and the turntable journal surface 33.

The turntable ring 30 further comprises a plurality of similar arcuate mounting slots 35 on a circular arc concentric with the circular plates 10 and 20. Each slot 35 has on one end a first large slot opening 36. On the arcuate slot end opposite the first large opening 36 may be a second large opening 37.

The latch pin unit 50 comprises a right cylindrical shell housing 51 with a first concentric hole 52 in one end 53 and an open second opposite end 54 defining a cylindrical cavity 55 therein. The unit further comprises a latch pin 56 with a rod 57 extending out of the housing first concentric hole 52 and a head 58 on the rod inside, but extending out of, the housing 51 and slidably fit in the housing in the manner of a piston in a cylinder. Around the latch pin rod 57 is a spring 59 extending within the cylinder cavity 55 maintaining the latch pin head 58 under a bias. In the rod end 60 extending out of the cylinder 51 is a keeper ring 61 larger than the cylinder first hole 52 to keep the rod from falling out of the cylinder under the spring bias within. A flexible hand extension release device 70 comprising a strap 71 with a buckle, Velcro attachment, or any other functionally similar device, on each end for attachment to the keeper ring 61 and to the user within easy reach of his arm.

In face-to-face contact with the turntable ring 30 is the boot binding plate 40 which further comprises a plurality of lock pins 41 extending from the plate and located opposite the mounting slots 35 of the turntable ring. Each lock pin 41 comprises a flange 42 secured to the boot binding plate 40 and a shoe 43 sized to fit into the turntable slot large openings 36 and 37. Between the flange 42 and the shoe 43 is a narrowing waist 44 sized to slidably fit into the turntable ring slot waist opening 44. The boot binding plate 40 is thereby secured to the turntable 30 in a hold position by inserting the shoe 43 of the respective lock pins into the turntable large opening 36 and 37. The boot binding plate 40 is secured to the turntable ring 30 by then rotating the boot binding plate 40 with the lock pin waist 44 moving into the arcuate slot 35.

The boot binding plate also comprises a plurality of guide pins 45 on a circular arc on the boot binding plate outside of the lock pins 41 and outside the radius of the turntable ring 30, extending slightly farther from the plate than do the lock pins. The guide pins 45 first orient the boot binding plate over the turntable ring generally. Slight movement then quickly locates the lock pin shoes 43 into the turntable slots 35.

The latch pin unit 50 is mounted to the boot binding plate 40 in matching location with the latch pin hole 32 of the turntable ring 30 such that when the relative position of the boot binding plate 40 to the turntable ring 30 is in set position, the latch pin head 58 aligns and sets into the latch pin hole 32. The boot binding plate 40 is released from the turntable ring 30 with the flexible hand release device 70 by pulling the keeper ring 61 on the latch pin unit 50, removing the latch pin rod 57 from the latch pin hole 32, then rotating the boot binding plate 40 until the lock pin shoe 43 moves away from the narrow arcuate slot 35 into alignment with the large slot opening 36 or 37.

An adapter plate 80 with snowboard mounting holes 81 in alignment with snowboard threaded holes 101 can be used in combination with the releasable snowboard boot binding coupling. The adapter plate 80 is mounted to the snowboard with screws (not shown) through the aligned holes. The adapter further comprises threaded holes 82 that match mounting plate holes 34 or turntable slots 38. In this combination, then, an adapter plate can be employed to accommodate any snowboard threaded hole pattern with a hole pattern of the releasable snowboard boot binding coupling.

Having described the invention, which is claimed is:

1. In combination with a snowboard having a plurality of threaded screw holes, a releasable snowboard boot binding coupling comprising:

a circular turntable ring with a center hole, the turntable ring having a plurality of arcuate mounting slots on a circular arc concentric with the center hole, each of the slots having a first large slot opening on one end thereof, a boot binding plate having a plurality of lock pins extending downwardly from the boot binding plate and located opposite the arcuate mounting slots of the turntable ring, each lock pin having a flange secured to the binding plate, a shoe sized to fit into and through a respective one of the turntable arcuate slot large openings, and a narrowing waist between the flange and the shoe sized such that upon partial rotation of the boot binding plate, the narrowing waist of the lock pin slidably passes into the turntable ring arcuate slot, a spacer plate secured to the turntable to separate the turntable from the snowboard, means to adjustably secure the turntable with the spacer plate to the snowboard, and latching mans for releasably latching the turntable ring to the boot binding plate with the boot binding plate lock pin held in the turntable arcuate slot.

2. The invention of claim 1 wherein the means to adjustably secure the turntable *ring* with spacer plate to the snowboard comprises

[a turntable with a center hole and having] an inner annular journal surface on the turntable *ring* about the center hole, a circular mounting plate having an annular raceway formed by a circumferential flat on the plate edge matching the journal surface of the turntable *ring* such that the mounting plate fills the turntable *ring* center hole with its annular raceway overlapping the turntable journal surface allowing the turntable *ring* to rotate under the mounting plate when loosely mounted, *and* means to tightly and removably secure the mounting plate to the snowboard.

3. The invention of claim 2 wherein the means to tightly and removably secure the mounting plate to the snowboard comprises

*a set of mounting holes in the mounting plate,*

[a spacer plate having] a set of mounting holes *in the spacer plate* matching the threaded holes [of] *in* the snowboard *and matching the mounting holes in the mounting plate*, a plurality of screws passing through aligned mounting holes [of] *in* the mounting plate and *the spacer plate,* into the threaded holes in the snowboard, with the mounting plate on the turntable ring with its raceway over the journal surface.

4. The invention of claim 1 wherein the means for latching the turntable ring to the boot binding plate comprises

[a circular turntable ring with] a latch pin hole *in the circular turntable ring*, and a release latch pin unit with a latch pin under bias, sized and located to releasably fit into the latch pin hole.

5. The invention of claim 4 wherein the release latch pin unit comprises a right cylindrical shell housing with a first concentric hole in one end and an open second opposite end defining a cylindrical cavity therein,

[a] *and the* latch pin further comprising a rod extending out of the housing first concentric hole, and a head on the rod inside, but extending out of, the housing *and* slidably fitting in the housing, a spring extending within the cylinder cavity and around the latch pin rod maintaining the latch pin head under a bias, *and* a keeper ring in the rod end extending out of the cylinder and sized larger than the cylinder first hole.

6. The invention of claim 4 wherein the circular turntable ring further comprises a plurality of latch pin holes offset for adjustment of angular orientation of the boot binding plate on the turntable ring.

7. The releasable snowboard boot binding coupling in combination with a snowboard of claim 1 in further combination with an adapter plate between the snowboard and the first circular plate, means to secure the adapter plate to the snowboard, and means to secure the releasable snowboard boot binding to the adapter plate.

8. The invention of claim 7 wherein the means to removably secure the adapter plate to the snowboard comprises

[an adapter plate with] a plurality of mounting holes *in said adapter plate and* aligned with two or more snowboard threaded holes, and a plurality of screws passing through [aligned] mounting holes [of] *in* the adapter plate and into the threaded holes in the snowboard, with the adapter plate set on the snowboard.

9. The invention of claim 1 wherein the means to adjustably secure the turntable *ring* with spacer plate to the snowboard comprises

[a turntable ring further comprising] a second plurality of arcuate slots on a concentric arc *in the turntable ring*, and screws passing through the second arcuate slots into threaded holes in the snowboard, allowing [the turntable] angular rotation *of the turn table ring lengthwise* through [its slot lengths] *said slots* when loosely mounted and affixing the turntable to the snowboard when securely tightened.

10. The invention of claim 1 further comprising a plurality of guide pins on a circular arc on the boot binding plate outside of the lock pins and the turntable and extending from the boot binding plate a distance greater than the lock pins extend.

11. The invention of claim 1 further comprising a second large opening on the end of the arcuate slot opposite the first large opening.

12. The invention of claim 1 further comprising means for releasing the latching means.

13. The invention of claim 12 wherein the means for releasing the latching means comprises a strap with a buckle on each end for attachment to a keeper ring and to the user within easy reach of the user's arm.

14. The invention of claim 1 further comprising a plurality of guide pins on a circular arc on the boot binding plate outside of the lock pins and the turntable, extending slightly further from the plate than do the lock pins.

*15. An assembly for securing a boot to a snowboard, comprising:*

*a boot plate for attachment to the boot, the boot plate including a plurality of lugs, each lug rigidly attached at one end to the boot plate, each lug including an enlarged shoe at its distal end and a narrow waist between the boot plate and the shoe,*

*a turntable for attachment to an upper side of the snowboard, the turntable including a plurality of integrally formed arcuate guide rails arranged on a circular arc concentric with a center axis of the turntable,*

*a central portion of each guide rail being defined by a flange, to create an opening at one end of the guide rail, the flange being spaced above a bottom surface of the turntable, so that when the turntable secured to the snowboard, the flanges are spaced above the upper surface of the snowboard,*

*the lugs being arranged on the boot plate opposite the arcuate guide rails of the turntable such that the shoe of each lugs can be inserted into an opening and the boot plate can be selectively rotated within a range of angular positions, with the flanges overlapping the shoes in a manner capable of carrying forces perpendicular to the snowboard, in order to prevent the boot from lifting off the turntable,*

*and latch means for releasably latching the lugs to the turntable at a selected angular position.*

*16. The assembly of claim 15, wherein the latch means includes a spring biased lock pin, the spring biased lock pin being secured to the boot plate.*

*17. The assembly of claim 16, wherein the turntable includes holes or detents adapted to receive the latch pin and secure the boot plate at a selected position.*

*18. The assembly of claim 16, wherein the latch means further includes a strap secured to the latch pin, to facilitate displacing the latch pin from a hole or detent.*

*19. The assembly of claim 15, wherein the turntable includes an outer band portion that encloses the arcuate guide rails to create arcuate slots, and further comprising a plurality of guide pins secured to the boot plate and arranged on a circular arc larger than the circular arc of the turntable slots yet concentric with the turntable center axis, the outer peripheral edge of the outer band portion adapted to engage the guide pins, in order to align the lugs opposite the openings.*

*20. The assembly of claim 19, wherein the guide pins extend from the boot plate a distance sufficient to engage the upper surface of the snowboard when the boot plate and turntable are secured to the snowboard.*

*21. The assembly of claim 19, wherein the latch means includes a latch pin and a plurality of holes or detents, the holes or detents being located in the outer band portion of the turntable.*

*22. The assembly of claim 15, wherein the turntable includes an outer band portion that encloses the arcuate guide rails to create arcuate slots, and wherein the central portion of each slot is defined by a pair of opposed flanges, to create a large slot opening at one end of the slot and a narrow central slot portion for receiving the narrow waist of a lug.*

*23. The assembly of claim 22, wherein the size of each large slot opening is slightly greater than the size of a shoe, and the narrow central slot portion of each slot is slightly wider than the narrow waist of a lug.*

*24. The assembly of claim 22, wherein each pair of opposed flanges create a large slot opening at each end of a slot, both large slot openings of each slot adapted to receive a shoe.*

*25. The assembly of claim 15, wherein the turntable includes a center opening, and further comprising a mounting plate adapted to overlay the center opening and a portion of the turntable defining the center opening, and means to tightly and removably secure the mounting plate to the snowboard with the turntable sandwiched between the mounting plate and the snowboard, whereby the turntable can rotate under the mounting plate when the mounting plate is loosely secured to the snowboard.*

*26. The assembly of claim 15, wherein a central region of the turntable is thicker than the area proximate to the flanges, the thicker central region providing means to space the flanges above the snowboard.*

*27. In combination with a snowboard, a releasable boot to snowboard coupling comprising:*

*a turntable with a center axis, the turntable having a plurality of integrally formed arcuate guide rails on a circular arc concentric with the center axis, each of the guide rails defining a large opening on one end thereof,*

*a boot plate having a plurality of lock rigidly attached at one end to the boot plate, the lock lugs extending downwardly from the boot plate and located opposite the arcuate guide rails of the turntable, each lock lug having a shoe sized to fit into and through a selected one of the turntable large openings, and a narrowing waist between the boot plate and the shoe sized such that upon partial rotation of the boot plate, the narrowing waist of the lock lug slidably passes along the turntable arcuate guide rail and the shoe engages with the arcuate guide rail,*

*a spacer portion to separate the turntable from the snowboard,*

*means to secure the turntable and spacer to the snowboard, and*

*latching means for releasably latching the turntable to the boot plate with the boot plate lock lug held against the turntable arcuate guide rail.*

*28. An assembly for securing a boot to a snowboard, the assembly comprising:*

*a turntable adapted to be secured to the snowboard;*

*a boot plate rotatably mounted on the turntable, the boot plate adapted to be selectively rotated on the turntable to a desired angular position;*

*a latch mechanism movable between a first position where the latch mechanism prevents rotation of the boot plate on the turntable, and a second position wherein the boot plate is free to rotate; and*

*a strap attached at one end to the latch mechanism and at its other end adapted to be secured to a snowboarder's body whereby pull on the strap displaces the latch mechanism from its first position to its second position, allowing the boot plate to rotate,*

*wherein the boot plate is releasably mounted to the turntable, by lugs rigidly attached to one of the boot plate and turntable and arcuate guide rails integrally formed on the other, the guide rails having portions engageable with said lugs at selected rotational angles of positions of the boot plate relative to the turntable for preventing removal of boot plate from the turntable.*

*29. The assembly of claim 28, wherein the latch mechanism includes a spring biased latch pin which is spring biased into the first position.*

* * * * *